No. 645. REISSUED JAN. 4, 1859.

T. W. HARVEY.

MACHINERY FOR DRESSING SCREW HEADS.

2 SHEETS—SHEET 1

Witnesses:

Wm. A. Bishop

Wm. M. Ingraham

T. W. Harvey

Assignee.

No. 645. REISSUED JAN. 4, 1859.
T. W. HARVEY.
MACHINERY FOR DRESSING SCREW HEADS.
2 SHEETS—SHEET 2.
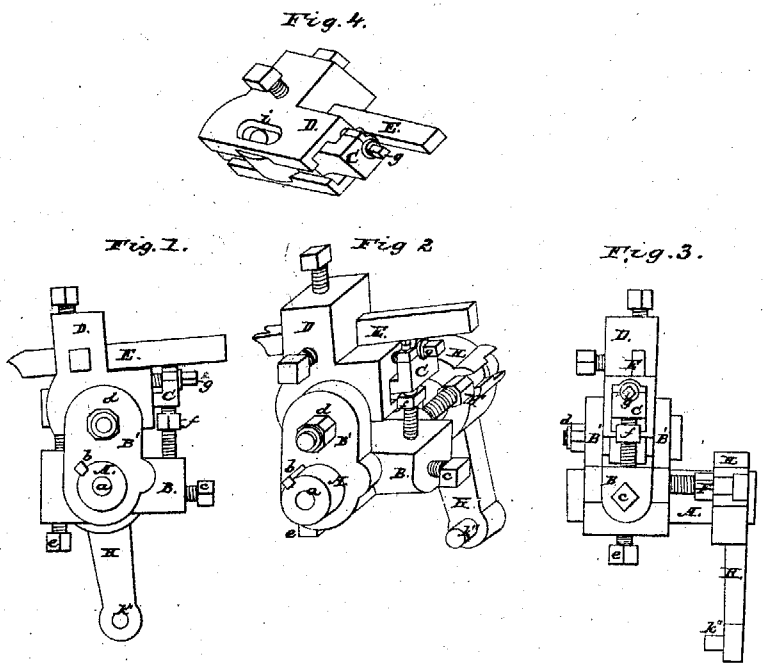
Witnesses:
Wm H Bishop.
Mm M. Ingraham
T. W. Harvey
Assignee.

UNITED STATES PATENT OFFICE.

H. A. HARVEY, OF NEW YORK, N. Y., ASSIGNEE, BY MESNE ASSIGNMENTS, OF THOMAS W. HARVEY.

IMPROVEMENT IN MACHINERY FOR DRESSING SCREW-HEADS.

Specification forming part of Letters Patent No. 4,700, dated August 18, 1846; Reissue No. 645, dated January 4, 1859.

*To all whom it may concern:*

Be it known that THOMAS W. HARVEY, of the city of New York, in the State of New York, deceased, did in his life-time, invent certain new and useful Improvements in the Manner of Constructing a Machine for Turning the Heads of Wood-Screws; and I do hereby declare that the following is a full, clear, and exact description thereof.

Figure 1:
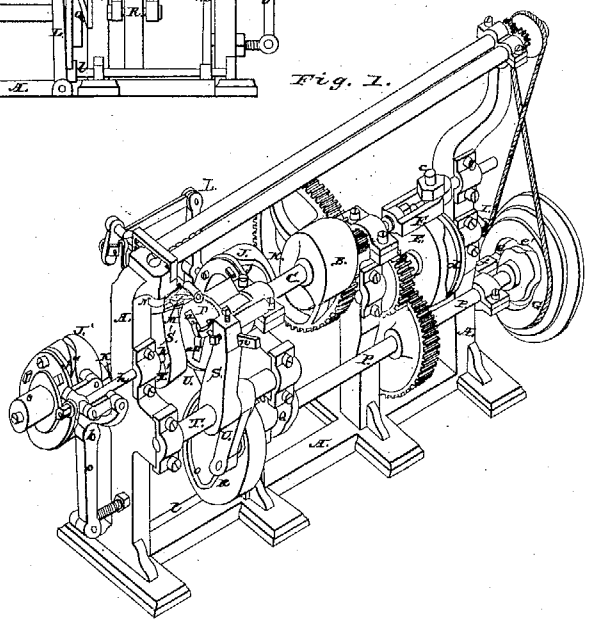
Figure 2:
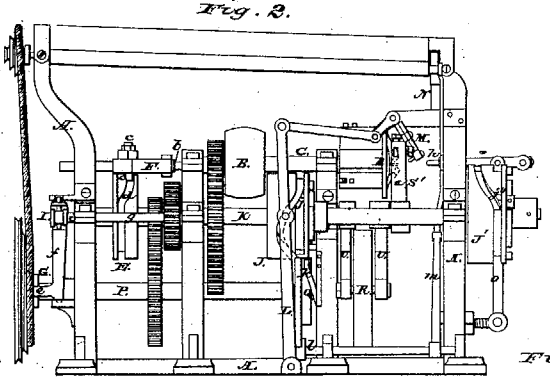

In the accompanying drawings, Figure 1 is a perspective view of the machine, taken from the front thereof. Fig. 2 is an elevation of the back of the machine, and Fig. 3 a horizontal section through certain parts of it, exhibiting the arrangement of the inner portion of the screw-holder and of the hollow shafts through which some of the operating parts of the machine are actuated, the same parts, wherever they are represented, being designated by the same letters of reference.

Many of the features of this machine correspond in substance with corresponding parts in a machine for threading wood-screws, described in Letters Patent granted to the said Thomas W. Harvey on the 30th day of May, 1846, and need not therefore be described in this specification, except so far as it may be necessary to a clear understanding of their application in connection with the invention hereinafter to be described.

This machine-like the one for cutting the threads on wood-screws before referred to, is self-feeding, and the blanks which are to have their heads turned are to be placed in a hopper or between rollers operating as a hopper, whence they are to be passed, one by one, through a vertical conductor, are to be received therefrom by spring feeding-fingers, and by them delivered so as to be held by gripping-jaws in a suitable chuck while they are being turned. The manner of arranging the hopper, of giving motion to its rollers, and of separating one blank at a time, so as to allow it to pass through the vertical conductor, are the same in all particulars with those set forth in the specification of the before-named patent of the machine for cutting the threads. There is, however, considerable difference in the manner of arranging and operating the transferring-fingers and of the lever or rod which moves the slide to separate blanks one at a time in the machine now under description, in order to adapt them to the other parts thereof, and these differences will be presently pointed out.

A A is the frame of the machine.

B is the driving-pulley, placed on a hollow spindle or mandrel, C, which spindle carries the chuck D, that contains the gripping-jaws *a a*, which are opened and closed in a manner similar to that used and fully described in the specification of the before named threading-machine. The blank, however, is delivered between the gripping-jaws in a direction the reverse of that required in the threading-machine. The rod *b b'*, Fig. 3, that passes through the hollow spindle C, is that which opens and closes the gripping-jaws *a a*.

E is the grooved cylinder or cam that operates on the rod *b b'*, as in the threading-machine.

Figure 3:
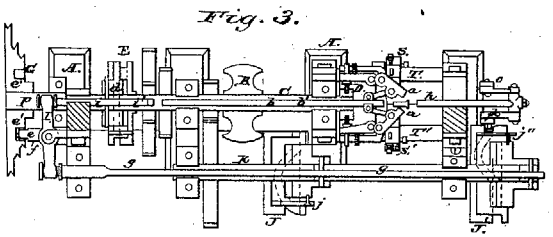

F, Figs. 1 and 2, is the sliding swivel to which the rod *b b'* is attached, a guide-pin, *c*, Figs. 1 and 2, from which enters a groove in the cam E, and thereby determines the opening and closing of the jaws. A switch, *d*, on said cam is moved back and forth by the rod *i i'*, attached to said switch in a manner similar to that of the like cylindrical cam in the threading-machine the grooved-face cam G in the shaft P performing the office of what is denominated the "index cam" in that machine, and this it does in the following manner:

I, Fig. 3, Plate 1, is a vibrating lever that is rocked by the grooved cam G, a guide-pin, *e*, Figs. 1, 2, and 3, on the arm *f*, descending from said lever and entering the groove *e'*, Fig. 1, in the cam and as one end of the rod *i i'* is attached to said lever it moves it back and forth at the proper time.

J J' are two grooved cylindrical cams on the hollow shaft K K, through which the rod *g g* slides, the sliding being effected by the end of the lever I opposite to that which slides the rod *i i'*. The rod *g g* moves two switches, *j j'*—one on each of the cylindrical cams J and J'—so as to cause said cams to vibrate the levers upon which they are to operate, or to allow them to remain at rest, as required. The cam J operates the transferring-fingers through the intermedium of the lever L, as shown most distinctly in Fig. 2. M are the transferring-fingers, which, when brought into a horizontal position, receive a blank from the vertical conductor N, Figs. 1 and 2, and deliver it by the action of the lever L and its appendages, so as to be gripped by the gripping-jaws, the fingers being brought into a vertical position for that purpose. They then return to the horizontal position to receive a fresh blank, and a punch or driver, *h*, is advanced so as to force the blank out of the fingers and in to a proper distance within the gripping-jaws. The cam J′ is that which operates the punch or driver *h*, a guide-pin, *k*, on the lever *o* entering the groove in the cam for that purpose. The cam G is placed on the outer end of the shaft P, and this shaft carries also the cams Q and R. The cam Q is the feeding-cam, which in its revolution moves an arm, *k′*, Fig. 2, attached to a rock-shaft, *l*, and on the opposite end of this shaft is the feeding-lever *m*, that moves the slides, which allows a blank to fall through the conductor N. The cam R on the shaft P is called the "cutter and rest cam," as it serves to govern the action of the turning-tool and rest.

Figure 4:
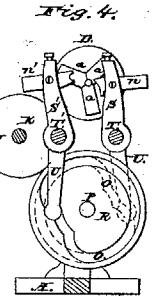

S S′, Fig. 1, are arms, one of which is a tool-holder, and the other carries a rest, which tool and rest are to be brought upon opposite sides of the blank the head of which is to be turned. The tool *n* in the arm S has a V-notch in it that is adapted to the turning of the face and bevel of the head. This tool is adjustable in the tool-holder, as is also a piece forming the rest, which piece bears against the opposite side of the blank. The arms S S′ are affixed to rock-shafts T T′, to which also are affixed the arms U U. These latter have guide-pins on them which enter grooves O O on each of the faces of the cutter and rest cam R, the grooves being so formed on the opposite sides of the cam as to advance and draw back the tool and rest simultaneously. The object of moving the rest out of the way is to admit of the after operation of inserting the blank in the jaws. Fig. 4 is a cross vertical section through a part of the machine, giving a direct face view of the cam R and a side view of the arms S S′ and of one of the arms U on the shafts T T′. In this figure, *n′* is the rest. The other parts are designated by their appropriate letters. The groove O on the reverse side of the cam R is represented by dotted lines.

In the gearing of this machine the shaft X is made to move five to one slower than the spindle C, and five to one faster than the shaft P, making the last, P, twenty-five to one slower than the spindle. The cutting apparatus receives its motion in this machine from the cam G, which is placed on the slowest shaft, P. The cutting-tool and rest, which are governed by the cam R on this shaft, are kept in operation on the blank during four-fifths of the time of its revolution, and are withdrawn during one-fifth only, thus allowing sufficient time for the transferring-fingers to move down and to supply a fresh blank to the jaws.

In the foregoing description has been presented the tool-holder and its immediate appendages which constitute the cutting apparatus in its most simple form; but it is intended in general to use it in that which is to be described, and which is named the "adjustable turning head," in which its respective parts are made susceptible of every necessary change of position—such, for example, as the raising of the cutting-point of the tool, of regulating its distance from the head of the blank, and of moving said adjustable head longitudinally with the machine—thereby adapting it more perfectly to screws of different lengths. This manner of arranging the adjustable head and tool-holder is shown in the sheet of drawings marked No. 2, in which sheet this part of the apparatus is drawn of the full size of an operating machine.

A A, Figs. 1, 2, and 3, Sheet No. 2, is the rock-shaft on which the adjustable head is affixed, a similar rock-shaft being used for the rest, as above described. These rock-shafts may turn on adjusting-screws adapted to their centers *a a* in the ordinary manner. This shaft corresponds with that marked T in the first sheet of drawings.

B B, Figs. 1, 2, and 3, is the base of the adjustable head. The check-pins B′ B′, which extend above the part B, constitute a part of this base, and sustain the tool-holder proper. The part B B′ is keyed or otherwise firmly attached to the shaft A; but it may be slid endwise on it. This part is held from turning round on said shaft by a feather, *b b*, Figs. 1 and 2, and is fastened in place by the tempering-screw *c*. In setting this head on the shaft A it may be regulated longitudinally on said shaft in the most perfect manner by the tempering-screw F, Figs. 2 and 3, which passes through the head of the arm H, which arm is firmly affixed to the shaft. C C is a slide or rest piece upon which the tool-holder D is placed, and upon which it may be slid endwise. The rest-piece is connected to the check-pieces B′ B′ by a bolt, *d*, on which it may be made to turn. It may be adjusted with precision and held in place by the tempering-screws *e* and *f*.

D D in each of the figures is the tool-holder proper, which is nicely fitted to and is made to slide upon the seat-piece C, the tempering-screws *g g* serving to adjust them to each other. To admit of their necessary adjustment there are slots made through sides of the tool-holder, as shown at *i*, Fig. 4. E is the cutting-tool, which is the same with that already described in this specification.

H, Figs. 1, 2, and 3, is the arm which vibrates the rock-shaft A by the aid of the guide-pin *k″*, which enters the groove in the cam, as already described.

From the foregoing description it will be perceived that an essential feature of the invention of the said THOMAS W. HARVEY relates to the method of transferring the screw-blanks, one at a time, from where they are presented and inserting them, point foremost, into the jaws of the mandrel or spindle, and that this part of the said invention consists in the employment of a pair of spring-pinchers, which receive the screw-blanks, one at a time, and present them, point foremost, to the gripping-jaws, and as in such machine the cutter, when set, always acts at the same distance from the jaws or equivalents on the mandrel for holding and rotating the blank, it is important that the blank, when inserted in the jaws or other holders, should be so inserted as to insure the bringing of the head always at the same place relatively to the cutter; and as it would be difficult to attain the required accuracy by means of the transferring-pinchers alone, and the said pinchers if applied to insert the point of the blank into the jaws, require to be opened to escape from the blank on account of its head, the said invention of the said THOMAS W. HARVEY also consists in the employment of a punch or driver, which, operating by a positive motion, acts against the head of the blank and forces it to the required distance into the jaws, so that the heads of any number of blanks so inserted will all be brought to the required position to be properly acted upon by the cutter, the said punch, when used in combination with spring-pinchers, at the same time opening the pinchers by forcing the head of the blank through and liberating the pinchers, that they may be carried back to receive another blank for the next operation; but it will be obvious from the foregoing that the said punch or driver may be used in connection with any other or equivalent device for presenting the blanks in line with the axis of the mandrel.

It will be understood that the mode of application of the said invention of the said THOMAS W. HARVEY may be greatly varied without changing the principle of the said invention.

What is claimed as the invention of the said THOMAS W. HARVEY is—

1. The employment of a pair of spring-pinchers which receive the blanks, one at a time, and present them to the jaws point foremost, substantially as described.

2. In combination with the mandrel and jaws or equivalent means for receiving and holding the screw-blanks, the employment of a punch or driver for inserting the blank to the required distance, substantially as described.

3. The combination of the pinchers for transferring and presenting the blank to the jaws or equivalent therefor with the punch or driver, substantially as described, for driving the blanks out of the pinchers and into the jaws, as set forth.

4. The combination of the movable rest with the movable cutter-head, substantially as described, and for the purpose of giving support to the blank while under the operation of the cutter, and to relieve the blank and get out of the way so soon as the cutting operation is completed, and this is claimed whether the cutting operation be performed on the head or any other part of the blank.

5. The particular manner herein described of constructing the adjustable turning head, the slide or seat piece C, the tool-holder D, sliding on the piece C between the check-pieces B′, with the respective adjustments thereof combined, arranged, and operating so as to effect the setting of the tool, substantially as herein set forth.

6. The manner of operating the gripping dies and of separating the blanks in the hopper and conveying them to the feeding-fingers, being similar to those described and used in the machine for cutting the threads, are not herein claimed.

Witnesses: H. A. HARVEY.
WM. H. BISHOP,
WM. M. INGRAHAM.